United States Patent
Schroeder (10) Patent No.: US 10,876,770 B2
(45) Date of Patent: Dec. 29, 2020

(54) METHOD FOR OPERATING AN ELASTO-CALORIC HEAT PUMP WITH VARIABLE PRE-STRAIN

(71) Applicant: Haier US Appliance Solutions, Inc., Wilmington, DE (US)

(72) Inventor: Michael Goodman Schroeder, Louisville, KY (US)

(73) Assignee: Haier US Appliance Solutions, Inc., Wilmington, DE (US)

(*) Notice: Subject to any disclaimer, the term of this patent is extended or adjusted under 35 U.S.C. 154(b) by 170 days.

(21) Appl. No.: 15/955,805

(22) Filed: Apr. 18, 2018

(65) Prior Publication Data

US 2019/0323742 A1    Oct. 24, 2019

(51) Int. Cl.
| F25B 21/00 | (2006.01) |
| F25B 30/02 | (2006.01) |
| F25B 41/04 | (2006.01) |
| F25D 19/00 | (2006.01) |
| F25D 17/02 | (2006.01) |
| F25B 23/00 | (2006.01) |
| F25D 11/00 | (2006.01) |

(52) U.S. Cl.
CPC ............ *F25B 21/00* (2013.01); *F25B 30/02* (2013.01); *F25B 41/04* (2013.01); *F25D 19/006* (2013.01); *F25B 23/00* (2013.01); *F25B 2321/001* (2013.01); *F25D 11/00* (2013.01); *F25D 17/02* (2013.01)

(58) Field of Classification Search
CPC .......... F25B 23/00; F25B 21/00; F25B 30/02; F25B 2321/001; F25D 11/00; F25D 17/02; F25D 19/006

USPC ............................................ 62/440, 3.1, 3.2
See application file for complete search history.

(56) References Cited

U.S. PATENT DOCUMENTS

| 668,560 A | 2/1901 | Fulner et al. |
| 1,985,455 A | 12/1934 | Mosby |
| 2,671,929 A | 3/1954 | Gayler |
| 2,765,633 A | 10/1956 | Muffly |
| 3,618,265 A | 11/1971 | Croop |
| 3,816,029 A | 6/1974 | Bowen et al. |
| 3,844,341 A | 10/1974 | Bimshas, Jr. et al. |
| 3,956,076 A | 5/1976 | Powell, Jr. et al. |
| 4,037,427 A | 7/1977 | Kramer |

(Continued)

FOREIGN PATENT DOCUMENTS

| CA | 2893874 A1 | 6/2014 |
| CA | 2919117 A1 | 1/2015 |

(Continued)

OTHER PUBLICATIONS

International Search Report issued in connection with PCT Application No. PCT/US2014/042485 dated Oct. 23, 2014.

(Continued)

*Primary Examiner* — Joel M Attey
(74) *Attorney, Agent, or Firm* — Dority & Manning, P.A.

(57) ABSTRACT

A method for operating an elasto-caloric heat pump includes running the elasto-caloric heat pump with a pre-strain in an elasto-caloric stage of the elasto-caloric heat pump set to an initial pre-strain setting, and gradually shifting the pre-strain in the elasto-caloric stage of the elasto-caloric heat pump set away from the initial pre-strain setting and towards a final pre-strain setting over a time interval.

17 Claims, 3 Drawing Sheets

(56) References Cited

U.S. PATENT DOCUMENTS

| | | |
|---|---|---|
| 4,102,655 A | 7/1978 | Jeffery et al. |
| 4,107,935 A | 8/1978 | Steyert, Jr. |
| 4,197,709 A | 4/1980 | Hochstein |
| 4,200,680 A | 4/1980 | Sasazawa et al. |
| 4,259,843 A | 4/1981 | Kausch |
| 4,332,135 A | 6/1982 | Barclay et al. |
| 4,507,927 A | 4/1985 | Barclay |
| 4,507,928 A | 4/1985 | Johnson |
| 4,549,155 A | 10/1985 | Halbach |
| 4,554,790 A | 11/1985 | Toshiba |
| 4,557,228 A | 12/1985 | Samodovitz |
| 4,599,866 A | 7/1986 | Nakagome et al. |
| 4,625,519 A | 12/1986 | Hakuraku et al. |
| 4,642,994 A | 2/1987 | Barclay et al. |
| 4,735,062 A | 4/1988 | Woolley et al. |
| 4,741,175 A | 5/1988 | Schulze |
| 4,785,636 A | 11/1988 | Hakuraku et al. |
| 4,796,430 A | 1/1989 | Malaker et al. |
| 5,062,471 A | 11/1991 | Jaeger |
| 5,091,361 A | 2/1992 | Hed |
| 5,156,003 A | 10/1992 | Yoshiro et al. |
| 5,190,447 A | 3/1993 | Schneider |
| 5,249,424 A | 10/1993 | DeGregoria et al. |
| 5,336,421 A | 8/1994 | Kurita et al. |
| 5,339,653 A * | 8/1994 | DeGregoria ............ A62B 9/003 165/10 |
| 5,351,791 A | 10/1994 | Rosenzweig |
| 5,465,781 A | 11/1995 | DeGregoria |
| 5,599,177 A | 2/1997 | Hetherington |
| 5,661,895 A | 9/1997 | Irgens |
| 5,718,570 A | 2/1998 | Beckett et al. |
| 5,934,078 A | 8/1999 | Lawton, Jr. et al. |
| 6,332,323 B1 | 12/2001 | Reid et al. |
| 6,423,255 B1 | 7/2002 | Hoechsmann et al. |
| 6,446,441 B1 | 9/2002 | Dean |
| 6,467,274 B2 | 10/2002 | Barclay et al. |
| 6,517,744 B1 | 2/2003 | Hara et al. |
| 6,526,759 B2 | 3/2003 | Zimm et al. |
| 6,588,215 B1 | 7/2003 | Ghoshal |
| 6,612,816 B1 | 9/2003 | Vanden Brande et al. |
| 6,668,560 B2 | 12/2003 | Zimm et al. |
| 6,826,915 B2 | 12/2004 | Wada et al. |
| 6,840,302 B1 | 1/2005 | Tanaka et al. |
| 6,915,647 B2 | 7/2005 | Tsuchikawa et al. |
| 6,935,121 B2 | 8/2005 | Fang et al. |
| 6,946,941 B2 | 9/2005 | Chell |
| 6,971,245 B2 | 12/2005 | Kuroyanagi |
| 7,148,777 B2 | 12/2006 | Chell et al. |
| 7,297,270 B2 | 11/2007 | Bernard et al. |
| 7,313,926 B2 | 1/2008 | Gurin |
| 7,481,064 B2 | 1/2009 | Kitanovski et al. |
| 7,552,592 B2 | 6/2009 | Iwasaki et al. |
| 7,644,588 B2 | 1/2010 | Shin et al. |
| 7,863,789 B2 | 1/2011 | Zepp et al. |
| 7,897,898 B2 | 3/2011 | Muller et al. |
| 7,938,632 B2 | 5/2011 | Smith |
| 8,061,147 B2 | 11/2011 | Dinesen et al. |
| 8,069,662 B1 | 12/2011 | Albert |
| 8,099,964 B2 | 1/2012 | Saito et al. |
| 8,174,245 B2 | 5/2012 | Carver |
| 8,191,375 B2 | 6/2012 | Sari et al. |
| 8,209,988 B2 | 7/2012 | Zhang et al. |
| 8,216,396 B2 | 7/2012 | Dooley et al. |
| 8,310,325 B2 | 11/2012 | Zhang et al. |
| 8,375,727 B2 | 2/2013 | Sohn |
| 8,378,769 B2 | 2/2013 | Heitzler et al. |
| 8,448,453 B2 | 5/2013 | Bahl et al. |
| 8,551,210 B2 | 10/2013 | Reppel et al. |
| 8,596,084 B2 | 12/2013 | Herrera et al. |
| 8,616,009 B2 | 12/2013 | Dinesen et al. |
| 8,656,725 B2 | 2/2014 | Muller et al. |
| 8,695,354 B2 | 4/2014 | Heitzler et al. |
| 8,729,718 B2 | 5/2014 | Kuo et al. |
| 8,763,407 B2 | 7/2014 | Carroll et al. |
| 8,769,966 B2 | 7/2014 | Heitzler et al. |
| 8,869,541 B2 | 10/2014 | Heitzler et al. |
| 8,904,806 B2 | 12/2014 | Cramet et al. |
| 8,935,927 B2 | 1/2015 | Kobayashi et al. |
| 8,978,391 B2 | 3/2015 | Muller et al. |
| 9,175,885 B2 | 11/2015 | Katter |
| 9,245,673 B2 | 1/2016 | Carroll et al. |
| 9,377,221 B2 | 6/2016 | Benedict |
| 9,400,126 B2 | 7/2016 | Takahashi et al. |
| 9,523,519 B2 | 12/2016 | Muller |
| 9,534,817 B2 | 1/2017 | Benedict et al. |
| 9,548,151 B2 | 1/2017 | Muller |
| 9,599,374 B2 | 3/2017 | Takahashi et al. |
| 9,631,843 B2 | 4/2017 | Benedict |
| 9,702,594 B2 | 7/2017 | Vetrovec |
| 9,739,510 B2 | 8/2017 | Hassen |
| 9,797,630 B2 | 10/2017 | Benedict et al. |
| 9,810,454 B2 | 11/2017 | Tasaki et al. |
| 9,857,105 B1 | 1/2018 | Schroeder et al. |
| 9,857,106 B1 | 1/2018 | Schroeder et al. |
| 9,927,155 B2 | 3/2018 | Boeder et al. |
| 9,978,487 B2 | 5/2018 | Katter et al. |
| 10,006,675 B2 | 6/2018 | Benedict et al. |
| 10,018,385 B2 | 7/2018 | Radermacher et al. |
| 2002/0040583 A1 | 4/2002 | Barclay et al. |
| 2002/0066368 A1 | 6/2002 | Zornes |
| 2002/0087120 A1 | 7/2002 | Rogers et al. |
| 2003/0010054 A1 | 1/2003 | Esch et al. |
| 2003/0051774 A1 | 3/2003 | Saito |
| 2004/0093877 A1 | 5/2004 | Wada |
| 2004/0182086 A1 | 9/2004 | Chiang et al. |
| 2004/0187510 A1 | 9/2004 | Jung |
| 2004/0187803 A1 | 9/2004 | Regev |
| 2004/0250550 A1 | 12/2004 | Bruck |
| 2005/0017394 A1 | 1/2005 | Hochsmann et al. |
| 2005/0109490 A1 | 5/2005 | Harmon et al. |
| 2005/0217278 A1 | 10/2005 | Mongia et al. |
| 2005/0274676 A1 | 12/2005 | Kumar et al. |
| 2006/0130518 A1 | 6/2006 | Kang et al. |
| 2006/0231163 A1 | 10/2006 | Hirosawa et al. |
| 2007/0130960 A1 | 6/2007 | Muller et al. |
| 2007/0220901 A1 | 9/2007 | Kobayashi |
| 2008/0223853 A1 | 9/2008 | Muller et al. |
| 2008/0236171 A1 | 10/2008 | Saito et al. |
| 2008/0236175 A1 | 10/2008 | Chaparro Monferrer et al. |
| 2008/0303375 A1 | 12/2008 | Carver |
| 2009/0032223 A1 | 2/2009 | Zimmerman et al. |
| 2009/0091411 A1 | 4/2009 | Zhang et al. |
| 2009/0158749 A1 | 6/2009 | Sandeman |
| 2009/0217674 A1 | 9/2009 | Kaji et al. |
| 2009/0236930 A1 | 9/2009 | Nashiki |
| 2009/0266083 A1 | 10/2009 | Shin et al. |
| 2009/0308080 A1 | 12/2009 | Han et al. |
| 2009/0314860 A1 | 12/2009 | Wang et al. |
| 2009/0320499 A1 | 12/2009 | Muller et al. |
| 2010/0000228 A1 | 1/2010 | Wiest et al. |
| 2010/0058775 A1 | 3/2010 | Kaji et al. |
| 2010/0071383 A1 | 3/2010 | Zhang et al. |
| 2010/0116471 A1 | 5/2010 | Reppel |
| 2010/0122488 A1 | 5/2010 | Fukai |
| 2010/0150747 A1 | 6/2010 | Mehta et al. |
| 2010/0162747 A1 | 7/2010 | Hamel et al. |
| 2010/0209084 A1 | 8/2010 | Nelson et al. |
| 2010/0236258 A1 | 9/2010 | Heitzler et al. |
| 2010/0276627 A1 | 11/2010 | Mazet |
| 2010/0303917 A1 | 12/2010 | Watson et al. |
| 2011/0000206 A1 | 1/2011 | Aprad |
| 2011/0042608 A1 | 2/2011 | Reesink |
| 2011/0048031 A1 | 3/2011 | Barve |
| 2011/0048690 A1 | 3/2011 | Reppel et al. |
| 2011/0058795 A1 | 3/2011 | Kleman et al. |
| 2011/0061398 A1 | 3/2011 | Shih et al. |
| 2011/0062821 A1 | 3/2011 | Chang et al. |
| 2011/0082026 A1 | 4/2011 | Sakatani et al. |
| 2011/0094243 A1 | 4/2011 | Carroll et al. |
| 2011/0129363 A1 | 6/2011 | Sakai et al. |
| 2011/0154832 A1 | 6/2011 | Barve et al. |
| 2011/0162388 A1 | 7/2011 | Barve et al. |
| 2011/0168363 A9 | 7/2011 | Reppel et al. |
| 2011/0173993 A1 | 7/2011 | Muller et al. |

(56) References Cited

U.S. PATENT DOCUMENTS

| | | |
|---|---|---|
| 2011/0182086 A1 | 7/2011 | Mienko et al. |
| 2011/0192836 A1 | 8/2011 | Muller et al. |
| 2011/0218921 A1 | 9/2011 | Addala et al. |
| 2011/0239662 A1 | 10/2011 | Bahl et al. |
| 2011/0284196 A1 | 11/2011 | Zanadi |
| 2011/0302931 A1 | 12/2011 | Sohn |
| 2011/0308258 A1 | 12/2011 | Smith et al. |
| 2011/0314836 A1 | 12/2011 | Heitzler et al. |
| 2012/0031108 A1 | 2/2012 | Kobayashi et al. |
| 2012/0033002 A1 | 2/2012 | Seeler et al. |
| 2012/0036868 A1 | 2/2012 | Heitzler et al. |
| 2012/0045698 A1 | 2/2012 | Shima |
| 2012/0060526 A1 | 3/2012 | May et al. |
| 2012/0079834 A1 | 4/2012 | Dinesen |
| 2012/0222427 A1 | 9/2012 | Hassen |
| 2012/0222428 A1 | 9/2012 | Celik et al. |
| 2012/0266591 A1 | 10/2012 | Morimoto et al. |
| 2012/0266607 A1 | 10/2012 | Morimoto et al. |
| 2012/0267090 A1 | 10/2012 | Kruglick |
| 2012/0272665 A1 | 11/2012 | Watanabe et al. |
| 2012/0272666 A1 | 11/2012 | Watanabe |
| 2012/0285179 A1 | 11/2012 | Morimoto |
| 2012/0291453 A1 | 11/2012 | Watanabe et al. |
| 2013/0019610 A1 | 1/2013 | Zimm et al. |
| 2013/0020529 A1 | 1/2013 | Chang et al. |
| 2013/0104568 A1 | 5/2013 | Kuo et al. |
| 2013/0106116 A1 | 5/2013 | Kuo et al. |
| 2013/0145573 A1 | 6/2013 | Bizhanzadeh |
| 2013/0180263 A1 | 7/2013 | Choi et al. |
| 2013/0186107 A1 | 7/2013 | Shih et al. |
| 2013/0187077 A1 | 7/2013 | Katter |
| 2013/0192269 A1 | 8/2013 | Wang |
| 2013/0199460 A1 | 8/2013 | Duplessis et al. |
| 2013/0227965 A1 | 9/2013 | Yagi et al. |
| 2013/0232993 A1 | 9/2013 | Saito et al. |
| 2013/0255279 A1 | 10/2013 | Tomimatsu et al. |
| 2013/0269367 A1 | 10/2013 | Meillan |
| 2013/0298571 A1 | 11/2013 | Morimoto et al. |
| 2013/0300243 A1 | 11/2013 | Gieras et al. |
| 2013/0319012 A1 | 12/2013 | Kuo et al. |
| 2013/0327062 A1 | 12/2013 | Watanabe et al. |
| 2014/0020881 A1 | 1/2014 | Reppel et al. |
| 2014/0075958 A1 | 3/2014 | Takahashi et al. |
| 2014/0116538 A1 | 5/2014 | Tanaka et al. |
| 2014/0157793 A1 | 6/2014 | Johnson et al. |
| 2014/0165594 A1 | 6/2014 | Benedict |
| 2014/0165595 A1 | 6/2014 | Zimm et al. |
| 2014/0190182 A1 | 7/2014 | Benedict |
| 2014/0216057 A1 | 8/2014 | Oezcan |
| 2014/0260373 A1 | 9/2014 | Gerber et al. |
| 2014/0290273 A1 | 10/2014 | Benedict et al. |
| 2014/0290275 A1 | 10/2014 | Muller |
| 2014/0291570 A1 | 10/2014 | Klausner et al. |
| 2014/0305137 A1 | 10/2014 | Benedict |
| 2014/0305139 A1 | 10/2014 | Takahashi et al. |
| 2014/0311165 A1 | 10/2014 | Watanabe et al. |
| 2014/0325996 A1 | 11/2014 | Muller |
| 2014/0366557 A1 | 12/2014 | Mun et al. |
| 2015/0007582 A1 | 1/2015 | Kim et al. |
| 2015/0027133 A1 | 1/2015 | Benedict |
| 2015/0030483 A1 | 1/2015 | Ryu |
| 2015/0033762 A1 | 2/2015 | Cheng et al. |
| 2015/0033763 A1 | 2/2015 | Saito et al. |
| 2015/0047371 A1 | 2/2015 | Hu et al. |
| 2015/0068219 A1 | 3/2015 | Komorowski et al. |
| 2015/0089960 A1 | 4/2015 | Takahashi et al. |
| 2015/0096307 A1 | 4/2015 | Watanabe et al. |
| 2015/0114007 A1 | 4/2015 | Neilson et al. |
| 2015/0168030 A1 | 6/2015 | Leonard et al. |
| 2015/0184903 A1 | 7/2015 | Mun et al. |
| 2015/0211440 A1 | 7/2015 | Joffroy |
| 2015/0260433 A1 | 9/2015 | Choi et al. |
| 2015/0267943 A1 | 9/2015 | Kim et al. |
| 2015/0362224 A1 | 12/2015 | Benedict et al. |
| 2015/0362225 A1 | 12/2015 | Schwartz |
| 2015/0369524 A1 | 12/2015 | Ikegami et al. |
| 2016/0000999 A1 | 1/2016 | Focht et al. |
| 2016/0025385 A1 | 1/2016 | Auringer et al. |
| 2016/0032920 A1 | 2/2016 | Hatami Aghdam |
| 2016/0084544 A1 | 3/2016 | Radermacher et al. |
| 2016/0091227 A1 | 3/2016 | Leonard et al. |
| 2016/0146515 A1 | 5/2016 | Momen et al. |
| 2016/0216012 A1 | 7/2016 | Benedict et al. |
| 2016/0238287 A1 | 8/2016 | Benedict |
| 2016/0273811 A1 | 9/2016 | Smith et al. |
| 2016/0282021 A1 | 9/2016 | Zhao et al. |
| 2016/0298880 A1 | 10/2016 | Humburg |
| 2016/0355898 A1 | 12/2016 | Vieym Villegas et al. |
| 2016/0356529 A1 | 12/2016 | Humburg |
| 2016/0367982 A1 | 12/2016 | Pennie |
| 2017/0059213 A1 | 3/2017 | Barclay et al. |
| 2017/0071234 A1 | 3/2017 | Garg |
| 2017/0138648 A1 | 5/2017 | Cui |
| 2017/0176083 A1 | 6/2017 | Sul et al. |
| 2017/0309380 A1 | 10/2017 | Benedict et al. |
| 2017/0328603 A1 | 11/2017 | Barclay et al. |
| 2017/0328649 A1 | 11/2017 | Brandmeier |
| 2017/0370624 A1 | 12/2017 | Zimm et al. |
| 2018/0005735 A1 | 1/2018 | Scharf et al. |
| 2018/0023852 A1 | 1/2018 | Schroeder et al. |
| 2018/0195775 A1 | 7/2018 | Schroeder et al. |
| 2018/0283740 A1 | 10/2018 | Holladay et al. |
| 2018/0340715 A1 | 11/2018 | Benedict et al. |
| 2019/0003748 A1 | 1/2019 | Gorbounov et al. |
| 2019/0178536 A1* | 6/2019 | Schroeder ............... F25B 23/00 |

FOREIGN PATENT DOCUMENTS

| | | |
|---|---|---|
| CN | 101280983 A | 10/2008 |
| CN | 101979937 A | 2/2011 |
| CN | 1019779937 A | 2/2011 |
| CN | 201772566 U | 3/2011 |
| CN | 101788207 B | 9/2011 |
| CN | 202432596 U | 9/2012 |
| CN | 103090583 A | 5/2013 |
| CN | 103712401 A | 4/2014 |
| CN | 102077303 B | 4/2015 |
| CN | 106481842 A | 3/2017 |
| DE | 102013223959 A1 | 5/2015 |
| DE | 202015106851 U1 | 3/2016 |
| EP | 0187078 A1 | 7/1986 |
| EP | 2071255 A1 | 6/2009 |
| EP | 2108904 A1 | 10/2009 |
| EP | 2215955 A1 | 8/2010 |
| EP | 2322072 A2 | 5/2011 |
| EP | 2420760 A1 | 2/2012 |
| EP | 2813785 A1 | 12/2014 |
| EP | 3306082 A2 | 4/2018 |
| FR | 2935468 A1 | 3/2010 |
| JP | 59232922 A | 12/1984 |
| JP | H08166182 A | 6/1996 |
| JP | 3205196 B2 | 9/2001 |
| JP | 2002315243 A | 10/2002 |
| JP | 2007147136 A | 6/2007 |
| JP | 2007291437 A | 11/2007 |
| JP | 2008051412 A | 3/2008 |
| JP | 2010112606 A | 5/2010 |
| JP | 2010525291 A | 7/2010 |
| JP | 6212955 B2 | 12/2014 |
| JP | 2014228216 A | 12/2014 |
| JP | 5907023 B2 | 4/2016 |
| JP | 6079498 B2 | 2/2017 |
| JP | 6191539 B2 | 9/2017 |
| JP | 2017207222 A | 11/2017 |
| KR | 101100301 B1 | 12/2011 |
| KR | 101238234 B1 | 3/2013 |
| WO | WO0133145 A1 | 5/2001 |
| WO | WO0212800 A1 | 2/2002 |
| WO | WO03016794 A1 | 2/2003 |
| WO | WO2004/068512 A1 | 8/2004 |
| WO | WO2007/036729 A1 | 4/2007 |
| WO | WO2007/086638 A1 | 8/2007 |
| WO | WO2009/024412 A1 | 2/2009 |
| WO | WO2009/098391 A1 | 8/2009 |

(56) References Cited

FOREIGN PATENT DOCUMENTS

| WO | WO2010/119591 A1 | 10/2010 |
|---|---|---|
| WO | WO2011034594 A1 | 3/2011 |
| WO | WO2014099199 A1 | 6/2014 |
| WO | WO2014170447 A1 | 10/2014 |
| WO | WO2014173787 A1 | 10/2014 |
| WO | WO2015017230 A1 | 2/2015 |
| WO | WO2016035267 A1 | 3/2016 |
| WO | WO2017042266 A1 | 3/2017 |
| WO | WO2017081048 A2 | 5/2017 |
| WO | WO2017097989 A1 | 6/2017 |

OTHER PUBLICATIONS

International Search Report issued in connection with PCT Application No. PCT/US2014/017431 dated May 9, 2014.

International search report issued in connection with PCT/US2013/070518, dated Jan. 22, 2014.

Tetsuji Okamura, Performance of a room-temperature rotary magnet refrigerator, dated Nov. 28, 2005, Elsevier.

Journal of Alloys and Compounds, copyright 2008 Elsevier B..V.. Evaluation of Ni—Mn—In—Si Alloys for Magnetic Refrigerant Application, Rahul Das, A. Perumal and A. Srinivasan, Dept of Physics, Indian Institute of Technology, Oct. 10, 2011.

Effects of annealing on the magnetic entropy change and exchange bias behavior in melt-spun Ni—Mn—In ribbons, X.Z. Zhao, C.C. Hsieh, et al Science Direct, Scripta Materialia 63 (2010).

PCT International Search Report and Written Opinion issued in connection with PCT Application No. PCT/US2013/070023 dated Feb. 27, 2014.

Barbara Pulko, Epoxy-bonded La—Fe—Co—Si magnetocaloric plates, Journal of Magnetism and Magnetic Materials, 375 (2015) 65-73.

International Search Report of PCT/US2014/047925 dated Nov. 10, 2014.

Andrej Kitanovski, Present and future caloric refrigeration and heat-pump technologies, International Journal of Refrigeration, vol. 57 Sep. 2015, pp. 288-298.

C Aprea, et al., An innovative rotary permanent magnet magnetic refrigerator based on AMR cycle, Thermal Energy Systems: Production, Storage, Utilization and the Environment, dated May 2015, Napoli, Italy, pp. 1-5.

Stefano Dall'Olio, et al., Numerical Simulation of a Tapered Bed AMR, Technical University of Denmark, 2015, 2 pages.

* cited by examiner

METHOD FOR OPERATING AN ELASTO-CALORIC HEAT PUMP WITH VARIABLE PRE-STRAIN

FIELD OF THE INVENTION

The present subject matter relates generally to heat pumps, such as elasto-caloric heat pumps, for appliances.

BACKGROUND OF THE INVENTION

Conventional refrigeration technology typically utilizes a heat pump that relies on compression and expansion of a fluid refrigerant to receive and reject heat in a cyclic manner so as to effect a desired temperature change or transfer heat energy from one location to another. This cycle can be used to receive heat from a refrigeration compartment and reject such heat to the environment or a location that is external to the compartment. Other applications include air conditioning of residential or commercial structures. A variety of different fluid refrigerants have been developed that can be used with the heat pump in such systems.

While improvements have been made to such heat pump systems that rely on the compression of fluid refrigerant, at best such can still only operate at about forty-five percent or less of the maximum theoretical Carnot cycle efficiency. Also, some fluid refrigerants have been discontinued due to environmental concerns. The range of ambient temperatures over which certain refrigerant-based systems can operate may be impractical for certain locations. Other challenges with heat pumps that use a fluid refrigerant exist as well.

Elasto-caloric materials (ECMs), i.e. materials that exhibit the elasto-caloric effect, provide a potential alternative to fluid refrigerants for heat pump applications. In general, ECMs exhibit a change in temperature in response to a change in strain. The theoretical Carnot cycle efficiency of a refrigeration cycle based on an ECM can be significantly higher than for a comparable refrigeration cycle based on a fluid refrigerant. As such, a heat pump system that can effectively use an ECM would be useful.

Challenges exist to the practical and cost competitive use of an ECM, however. In addition to the development of suitable ECMs, equipment that can attractively utilize an ECM is still needed. Currently proposed equipment may require relatively large and expensive mechanical systems, may be impractical for use in e.g., appliance refrigeration, and may not otherwise operate with enough efficiency to justify capital cost.

Accordingly, a heat pump system that can address certain challenges, such as those identified above, would be useful. Such a heat pump system that can also be used in a refrigerator appliance would also be useful.

BRIEF DESCRIPTION OF THE INVENTION

Aspects and advantages of the invention will be set forth in part in the following description, or may be apparent from the description, or may be learned through practice of the invention.

In a first example embodiment, a method for operating an elasto-caloric heat pump includes running the elasto-caloric heat pump with a pre-strain in an elasto-caloric stage of the elasto-caloric heat pump set to an initial pre-strain setting. The elasto-caloric stage has an initial length in the initial pre-strain setting. The method also includes gradually shifting the pre-strain in the elasto-caloric stage of the elasto-caloric heat pump set away from the initial pre-strain setting and towards a final pre-strain setting over a time interval. The elasto-caloric stage has a final length in the final pre-strain setting. The final length is different than the initial length. The method further includes running the elasto-caloric heat pump at a plurality of pre-strain settings between the initial pre-strain setting and the final pre-strain setting over the time interval.

In a second example embodiment, a method for operating an elasto-caloric heat pump includes running the elasto-caloric heat pump with a pre-strain in an elasto-caloric stage of the elasto-caloric heat pump set to an initial pre-strain setting. The method also includes a step for increasing a fatigue life of the elasto-caloric stage by shifting the pre-strain in the elasto-caloric stage of the elasto-caloric heat pump set away from the initial pre-strain setting and towards a final pre-strain setting over a time interval.

In a third example embodiment, an appliance includes a cabinet. An elasto-caloric heat pump is positioned within the cabinet. The elasto-caloric heat pump includes an elasto-caloric stage having a length between a first end portion of the elasto-caloric stage and a second end portion of the elasto-caloric stage. A length adjustment mechanism is coupled to the first end portion of the elasto-caloric stage. The length adjustment mechanism is configured for adjusting a pre-strain of the elasto-caloric stage by changing the length of the elasto-caloric stage.

These and other features, aspects and advantages of the present invention will become better understood with reference to the following description and appended claims. The accompanying drawings, which are incorporated in and constitute a part of this specification, illustrate embodiments of the invention and, together with the description, serve to explain the principles of the invention.

BRIEF DESCRIPTION OF THE DRAWINGS

A full and enabling disclosure of the present invention, including the best mode thereof, directed to one of ordinary skill in the art, is set forth in the specification, which makes reference to the appended figures.

DETAILED DESCRIPTION

Reference now will be made in detail to embodiments of the invention, one or more examples of which are illustrated in the drawings. Each example is provided by way of explanation of the invention, not limitation of the invention. In fact, it will be apparent to those skilled in the art that various modifications and variations can be made in the present invention without departing from the scope or spirit of the invention. For instance, features illustrated or described as part of one embodiment can be used with another embodiment to yield a still further embodiment. Thus, it is intended that the present invention covers such modifications and variations as come within the scope of the appended claims and their equivalents.

Figure 1:
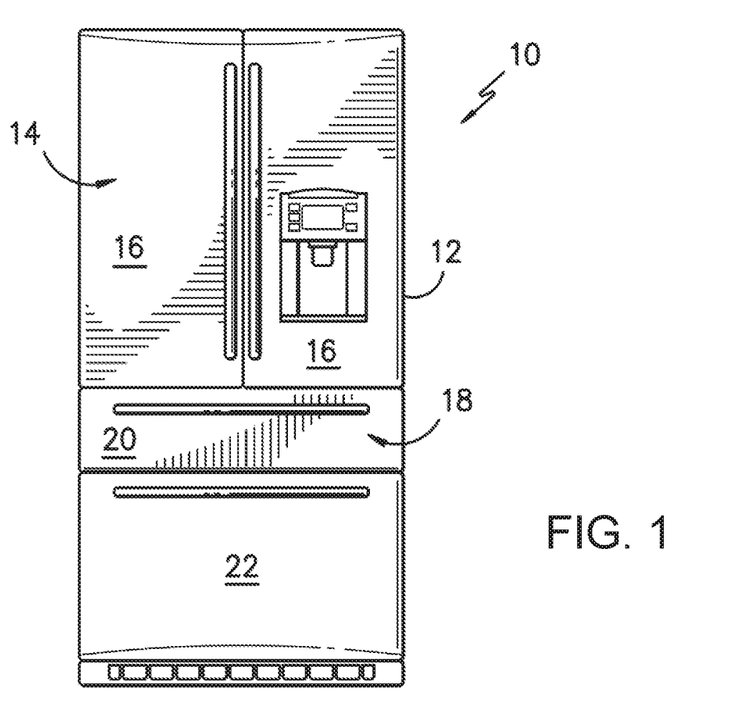
FIG. 1 provides an example embodiment of a refrigerator appliance of the present invention.

Referring now to FIG. 1, an example embodiment of a refrigerator appliance 10 is depicted as an upright refrigerator having a cabinet or casing 12 that defines a number of internal storage compartments or chilled chambers. In particular, refrigerator appliance 10 includes upper fresh-food compartments 14 having doors 16 and lower freezer compartment 18 having upper drawer 20 and lower drawer 22. The drawers 20, 22 are "pull-out" type drawers in that they can be manually moved into and out of the freezer compartment 18 on suitable slide mechanisms.

Refrigerator 10 is provided by way of example only. Other configurations for a refrigerator appliance may be used as well including appliances with only freezer compartments, only chilled compartments, or other combinations thereof different from that shown in FIG. 1. In addition, the heat pump and heat pump system of the present invention is not limited to appliances and may be used in other applications as well such as e.g., air-conditioning, electronics cooling devices, and others. Further, it should be understood that while the use of a heat pump to provide cooling within a refrigerator is provided by way of example herein, the present invention may also be used to provide for heating applications as well.

Figure 2:
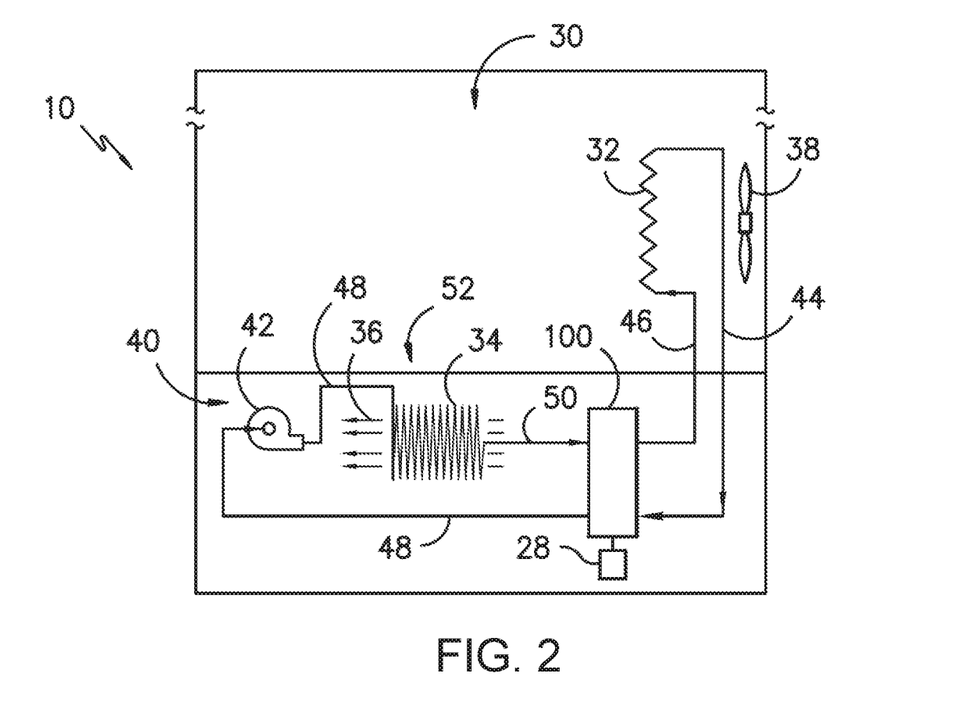
FIG. 2 is a schematic illustration of a heat pump system of the example refrigerator appliance of FIG. 1.

FIG. 2 is a schematic view of the refrigerator appliance 10. As may be seen in FIG. 2, refrigerator appliance 10 includes a refrigeration compartment 30 and a machinery compartment 40. Machinery compartment 30 includes a heat pump system 52 having a first heat exchanger 32 positioned in the refrigeration compartment 30 for the removal of heat therefrom. A heat transfer fluid such as e.g., an aqueous solution, flowing within first heat exchanger 32 receives heat from the refrigeration compartment 30 thereby cooling contents of the refrigeration compartment 30. A fan 38 may be used to provide for a flow of air across first heat exchanger 32 to improve the rate of heat transfer from the refrigeration compartment 30.

The heat transfer fluid flows out of first heat exchanger 32 by line 44 to heat pump 100. As will be further described herein, the heat transfer fluid receives additional heat from caloric material in heat pump 100 and carries this heat by line 48 to pump 42 and then to second heat exchanger 34. Heat is released to the environment, machinery compartment 40, and/or other location external to refrigeration compartment 30 using second heat exchanger 34. A fan 36 may be used to create a flow of air across second heat exchanger 34 and thereby improve the rate of heat transfer to the environment. Pump 42 connected into line 48 causes the heat transfer fluid to recirculate in heat pump system 52. Motor 28 is in mechanical communication with heat pump 100 as will further described.

From second heat exchanger 34 the heat transfer fluid returns by line 50 to heat pump 100 where, as will be further described below, the heat transfer fluid loses heat to the caloric material in heat pump 100. The now colder heat transfer fluid flows by line 46 to first heat exchanger 32 to receive heat from refrigeration compartment 30 and repeat the cycle as just described.

Heat pump system 52 is provided by way of example only. Other configurations of heat pump system 52 may be used as well. For example, lines 44, 46, 48, and 50 provide fluid communication between the various components of the heat pump system 52 but other heat transfer fluid recirculation loops with different lines and connections may also be employed. For example, pump 42 can also be positioned at other locations or on other lines in system 52. Still other configurations of heat pump system 52 may be used as well. For example, heat pump system 52 may be configured such that the caloric material in heat pump 100 directly cools air that flows through refrigeration compartment 30 and directly heats air external to refrigeration compartment 30. Thus, system 52 need not include a liquid working fluid in certain example embodiments.

Figure 3:
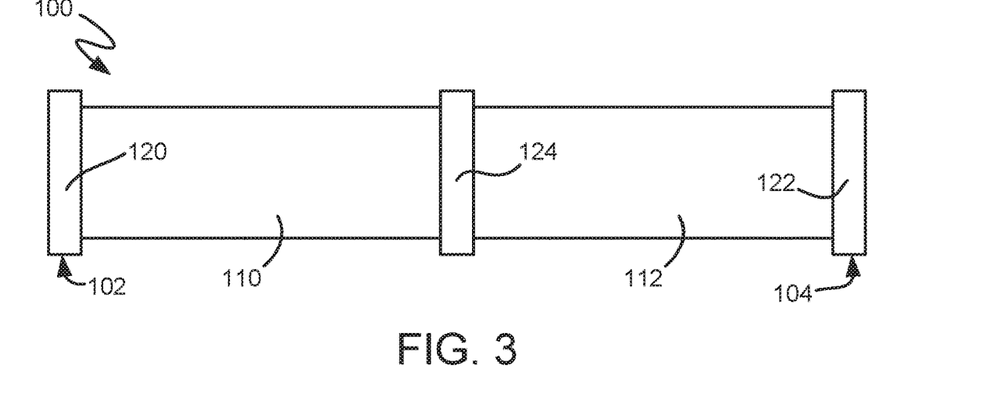
FIG. 3 is a schematic view of an elasto-caloric stage according to an example embodiment of the present invention.

FIG. 3 is a schematic view of an elasto-caloric stage 100 according to an example embodiment of the present invention. Elasto-caloric stage 100 may be used in heat pump 100, e.g., such that heat pump 100 is an elasto-caloric heat pump. Elasto-caloric stage 100 may be used in any other suitable elasto-caloric heat pump in alternative example embodiments. As discussed in greater detail below, elasto-caloric stage 100 includes features for adjusting a pre-strain in elasto-caloric stage 100. By adjusting the pre-strain in elasto-caloric stage 100, a fatigue life of elasto-caloric stage 100 may be increased, e.g., up to seven times, relative to the fatigue life of an elasto-caloric stage with a static or fixed pre-strain.

As may be seen in FIG. 3, elasto-caloric stage 100 extends, e.g., longitudinally, between a first end portion 102 and a second end portion 104. A first segment 110 of elasto-caloric stage 100 may be positioned at or proximate first end portion 102 of elasto-caloric stage 100, and a second segment 112 of elasto-caloric stage 100 may be positioned at or proximate second end portion 104 of elasto-caloric stage 100.

First and second segments 110, 112 of elasto-caloric stage 100 may be constructed of or with a caloric material that exhibits the elasto-caloric effect, e.g., when deformed (e.g., placed in tension or compression). The caloric material may be constructed from a single elasto-caloric material or may include multiple different elasto-caloric materials. By way of example, refrigerator appliance 10 may be used in an application where the ambient temperature changes over a substantial range. However, a specific elasto-caloric material may exhibit the elasto-caloric effect over only a much narrower temperature range. As such, it may be desirable to use a variety of elasto-caloric materials within elasto-caloric stage 100 to accommodate the wide range of ambient temperatures over which refrigerator appliance 10 and/or an associated elasto-caloric heat pump may be used.

A first coupling 120 is mounted at first end portion 102 of elasto-caloric stage 100, and a second coupling 122 is mounted at second end portion 104 of elasto-caloric stage 100. First coupling 120 may be mounted to a fixed component, such as a bracket, brace, housing, etc. Thus, first coupling 120 may correspond to a static constraint. Conversely, as discussed in greater detail below, second coupling 122 may be mounted to a movable component in order to allow adjustment of a pre-strain in elasto-caloric stage 100. Thus, second coupling 122 may correspond to a movable constraint. While being movable, the location of second coupling 122 may be fixed during operation of an associated elasto-caloric heat pump, e.g., such that the pre-strain in elasto-caloric stage 100 is static during operation of the associated elasto-caloric heat pump. First coupling 120 may be the movable constraint and second coupling 122 may be the static constraint in alternative example embodiments.

A third coupling 124 is mounted between first and second end portions 102, 104 of elasto-caloric stage 100. For example, third coupling 124 may be positioned at a middle portion of elasto-caloric stage 100. Third coupling 124 may be connected to a motor or other suitable actuator that is operable to deform elasto-caloric stage 100.

As noted above, elasto-caloric stage 100 includes elasto-caloric material that exhibits the elasto-caloric effect. During deformation of elasto-caloric stage 100, the elasto-caloric material in elasto-caloric stage 100 is successively stretched and relaxed between a high strain state and a low strain state. The high strain state may correspond to when the elasto-caloric material in elasto-caloric stage 100 is in tension and the elasto-caloric material in elasto-caloric stage 100 is elongated relative to a normal length of the elasto-caloric material in elasto-caloric stage 100. Conversely, the low strain state may correspond to when the elasto-caloric material in elasto-caloric stage 100 is in compression and the elasto-caloric material in elasto-caloric stage 100 is compressed relative to the normal length of the elasto-caloric material in elasto-caloric stage 100.

When the elasto-caloric material in elasto-caloric stage 100 is stretched to the high strain state, the deformation causes reversible phase change within the elasto-caloric material and an increase (or alternatively a decrease) in temperature such that the elasto-caloric material in elasto-caloric stage 100 rejects heat to a heat transfer fluid. Conversely, when the elasto-caloric material in elasto-caloric stage 100 is relaxed to the low strain state, the deformation causes reversible phase change within the elasto-caloric material and a decrease (or alternatively an increase) in temperature such that the elasto-caloric material in elasto-caloric stage 100 receives heat from a heat transfer fluid. By shifting between the high and low strain states, elasto-caloric stage 100 may transfer thermal energy by utilizing the elasto-caloric effect of the elasto-caloric material in elasto-caloric stage 100.

Figure 4:
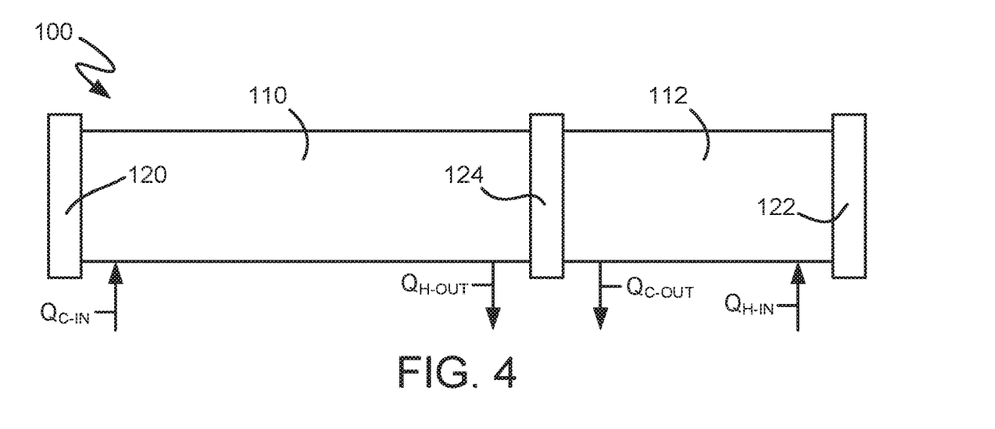
FIGS. 4 and 5 are schematic views of the example elasto-caloric stage of FIG. 3 during operation of an associated elasto-caloric heat pump.
Figure 5:
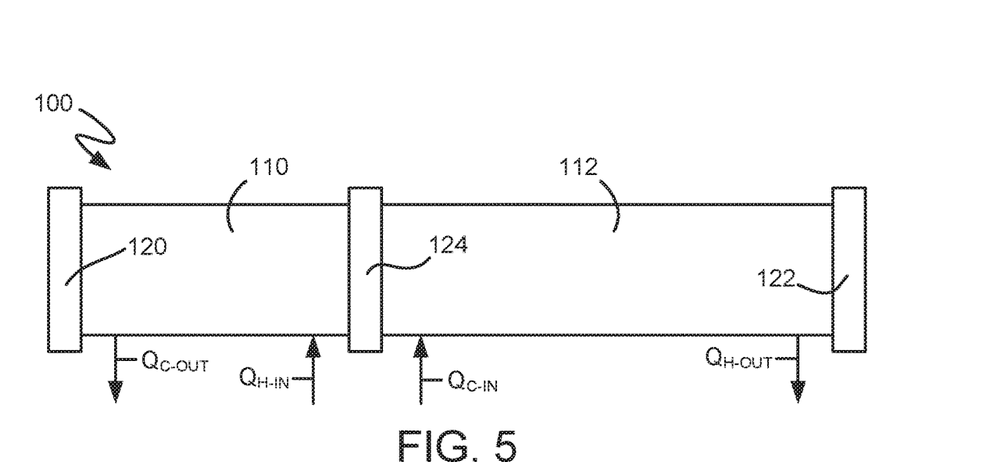

FIGS. 4 and 5 are schematic views of elasto-caloric stage 100 during operation of an associated elasto-caloric heat pump. In FIG. 4, first segment 110 of elasto-caloric stage 100 is in the high strain state, and second segment 112 of elasto-caloric stage 100 is in the low strain state. Conversely, in FIG. 5, first segment 110 of elasto-caloric stage 100 is in the low strain state, and second segment 112 of elasto-caloric stage 100 is in the high strain state. First and second segments 110, 112 may deform by one-half percent (0.5%) between the high and low strain states. The motor or other suitable actuator connected to third coupling 124 may operate to deform elasto-caloric stage 100 between the configurations shown in FIGS. 4 and 5 and thereby transfer thermal energy.

As an example, working fluid may be flowable through or to first and second segments 110, 112 of elasto-caloric stage 100. In particular, with reference to FIGS. 2 and 4, warm working fluid (labeled $Q_{C-IN}$) from first heat exchanger 32 may enter first segment 110 via line 44 when first segment 110 is in the high strain state, and the working fluid receives additional heat from elasto-caloric material in first segment 110 as the elasto-caloric material in first segment 110 is stretched and rejects heat under strain. The now warmer working fluid (labeled $Q_{H-OUT}$) may then exit first segment 110 via line 48 and flow to second heat exchanger 34 where heat is released to a location external to refrigeration compartment 30.

In addition, cool working fluid (labeled $Q_{H-IN}$) from second heat exchanger 34 may enter second segment 112 via line 50 when second segment 112 is in the low strain state, and the working fluid rejects additional heat to elasto-caloric material in second segment 112 as the elasto-caloric material in second segment 112 relaxes. The now cooler working fluid (labeled $Q_{C-OUT}$) may then exit second segment 112 via line 46, flow to first heat exchanger 32, and receive heat from refrigeration compartment 30.

Continuing the example, elasto-caloric stage 100 may be deformed from the configuration shown in FIG. 4 to the configuration shown in FIG. 5. With reference to FIGS. 2 and 5, warm working fluid $Q_{C-IN}$ from first heat exchanger 32 may enter second segment 112 via line 44 when second segment 112 is in the high strain state, and the working fluid receives additional heat from elasto-caloric material in second segment 112 as the elasto-caloric material in second segment 112 is stretched and rejects heat under strain. The now warmer working fluid $Q_{H-OUT}$ may then exit second segment 112 via line 48 and flow to second heat exchanger 34 where heat is released to a location external to refrigeration compartment 30.

In addition, cool working fluid $Q_{H-IN}$ from second heat exchanger 34 may enter first segment 110 via line 50 when first segment 110 is in the low strain state, and the working fluid rejects additional heat to elasto-caloric material in first segment 110 as the elasto-caloric material in first segment 110 relaxes. The now cooler working fluid $Q_{C-OUT}$ may then exit first segment 110 via line 46, flow to first heat exchanger 32, and receive heat from refrigeration compartment 30.

The above cycle may be repeated by deforming elasto-caloric stage 100 between the configurations shown in FIGS. 4 and 5. As may be seen from the above, elasto-caloric stage 100 alternately stretches and relaxes elasto-caloric material within first and second segments 110, 112 and utilizes working fluid (liquid or gas) to harvest the thermal effect. Although not shown, elasto-caloric stage 100 may also include valves, seals, baffles or other features to regulate the flow of working fluid described above.

Figure 6:
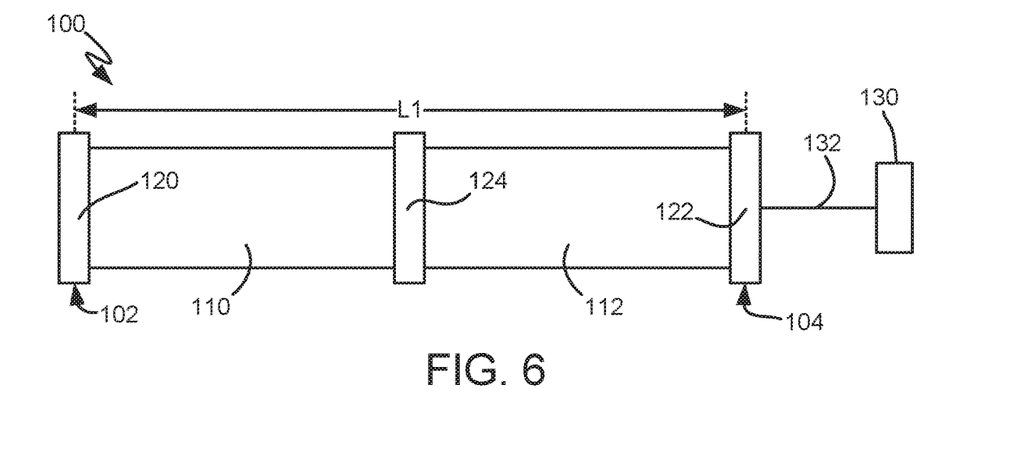
FIGS. 6 through 8 are schematic views of the example elasto-caloric stage of FIG. 3 in various pre-strain settings.
Figure 7:
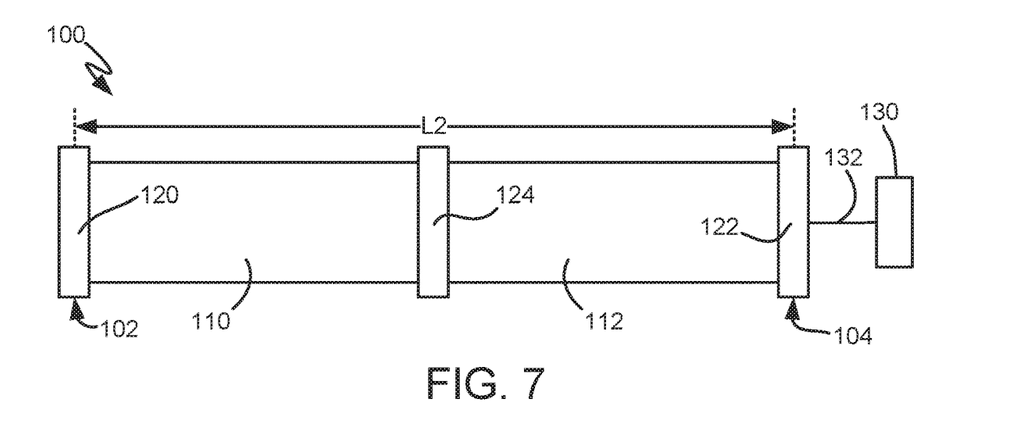
Figure 8:
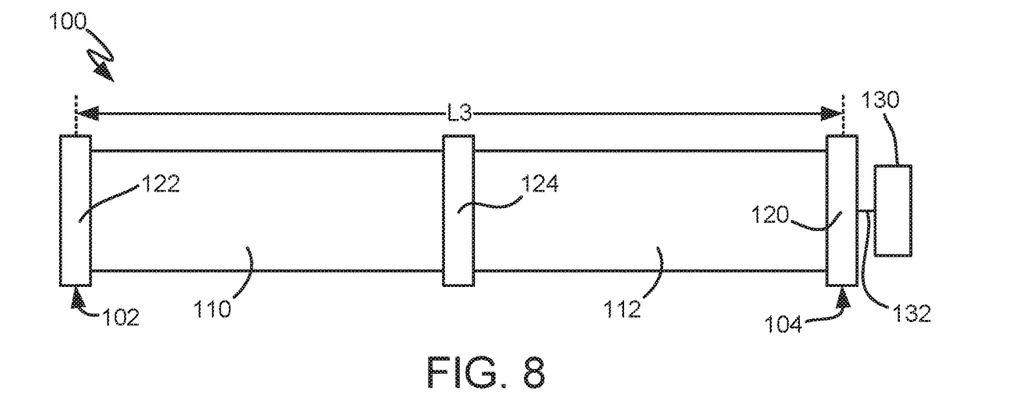

FIGS. 6 through 8 are schematic views of elasto-caloric stage 100 in various pre-strain settings. As discussed in greater detail below, the pre-strain in elasto-caloric stage 100 may be adjusted. By adjusting the pre-strain in elasto-caloric stage 100, a fatigue life of elasto-caloric stage 100 may be increased, e.g., up to seven times, relative to the fatigue life of an elasto-caloric stage with a static or fixed pre-strain.

As shown in FIGS. 6 through 8, elasto-caloric stage 100 includes a length adjustment mechanism 130. Length adjustment mechanism 130 is coupled to elasto-caloric stage 100 at second end portion 104 of elasto-caloric stage 100. Length adjustment mechanism 130 is operable to change the length of elasto-caloric stage 100 between first and second end portions 102, 104 of elasto-caloric stage 100. For example, length adjustment mechanism 130 arranges elasto-caloric stage 100 such that: (1) elasto-caloric stage 100 has a first length L1 between first and second end portions 102, 104 of elasto-caloric stage 100 in FIG. 6; (2) elasto-caloric stage 100 has a second length L2 between first and second end portions 102, 104 of elasto-caloric stage 100 in FIG. 7; and (3) elasto-caloric stage 100 has a third length L3 between first and second end portions 102, 104 of elasto-caloric stage 100 in FIG. 8. Length adjustment mechanism 130 is operable to change the length of elasto-caloric stage 100 to any of the first length L1, the second length L2, the third length L3 or any other suitable length.

Length adjustment mechanism 130 may be a suitable actuator for adjusting the length of elasto-caloric stage 100. For example, length adjustment mechanism 130 may be a mechanical, electro-mechanical or another suitable linear actuator with a shaft or piston of the linear actuator coupled to the second end portion 104 of elasto-caloric stage 100. Thus, it will be understood that length adjustment mechanism 130 may be manually operated or may automatically adjust the length of elasto-caloric stage 100. In FIGS. 6 through 8, length adjustment mechanism 130 includes a threaded shaft 132 coupled to second end portion 104 of elasto-caloric stage 100. By rotating threaded shaft 132 (e.g., with an electric motor), the length of elasto-caloric stage 100 may change.

By changing the length of elasto-caloric stage 100, length adjustment mechanism 130 is configured to adjust a pre-strain of elasto-caloric stage 100. The pre-strain of elasto-caloric stage 100 corresponds to a strain within elasto-caloric stage 100 when elasto-caloric stage 100 is stretched (i.e., placed in tension) such that the length of elasto-caloric stage 100 between first and second end portions 102, 104 of elasto-caloric stage 100 is increased relative a natural length of elasto-caloric stage 100 in an unstressed state. As noted above, by adjusting the pre-strain in elasto-caloric stage 100, the fatigue life of elasto-caloric stage 100 may be increased, e.g., up to seven times, relative to the fatigue life of an elasto-caloric stage with a static or fixed pre-strain.

A method for operating an elasto-caloric heat pump with elasto-caloric stage 100 will be described in greater detail below. First, the elasto-caloric heat pump with elasto-caloric stage 100 may be run with a pre-strain in elasto-caloric stage 100 set to an initial pre-strain setting. Elasto-caloric stage 100 has an initial length in the initial pre-strain setting. The initial length may be the first length L1 (FIG. 6), the third length L3 (FIG. 8), or another suitable length.

After operating with the initial pre-strain setting, the pre-strain in elasto-caloric stage 100 is gradually shifted away from the initial pre-strain setting and towards a final pre-strain setting over a time interval. Elasto-caloric stage 100 has a final length in the final pre-strain setting. The final length is different than the initial length. The elasto-caloric heat pump is run at a plurality of pre-strain settings between the initial pre-strain setting and the final pre-strain setting over the time interval. In particular, the elasto-caloric heat pump may be run with elasto-caloric stage 100 at various discrete pre-strain settings between the initial pre-strain setting and the final pre-strain setting.

The time interval may correspond to a service life of the elasto-caloric heat pump. Thus, e.g., the time interval may be no less than three years, no less than five years, no less than seven years, etc. As may be seen from the above, the pre-strain in elasto-caloric stage 100 is gradually shifted, e.g., periodically, to various pre-strain settings between the initial pre-strain setting and the final pre-strain setting over an extended period of time.

At each pre-strain setting, strain within elasto-caloric stage 100 only occurs in small sections of elasto-caloric stage 100 during deformation of elasto-caloric stage 100 while the elasto-caloric heat pump is operating. By changing the pre-strain in elasto-caloric stage 100, the location of strain within elasto-caloric stage 100 during deformation of elasto-caloric stage 100 while the elasto-caloric heat pump is operating also changes. In other words, different sections of the elasto-caloric stage 100 are strained during deformation of elasto-caloric stage 100 while the elasto-caloric heat pump is operating by changing the pre-strain in elasto-caloric stage 100. In such a manner, the fatigue life of elasto-caloric stage 100 may be increased over the service life of the elasto-caloric heat pump. Conversely, if the pre-strain remains constant, the same areas see repeated deformations and transform to accommodate the repeated strain.

In certain example embodiments, the pre-strain in elasto-caloric stage 100 is gradually reduced from the initial pre-strain setting to the final pre-strain setting over the time interval. Thus, e.g., length adjustment mechanism 130 may increase the pre-strain in elasto-caloric stage 100 by changing the length of elasto-caloric stage 100 from the third length L3 to the first length L1. In such example embodiments, the initial pre-strain setting may be no less than six percent (6%) and no greater than ten percent (10%), and the final pre-strain setting may be no less than one-half percent (0.5%) and no greater than four percent (4%). In particular, the initial pre-strain setting may be about two percent (2%), and the final pre-strain setting may be about eight percent (8%). As used herein, the term "about" means within one percent (1%) of the stated percentage when used in the context of pre-strains.

In alternative example embodiments, the pre-strain in elasto-caloric stage 100 is gradually increased from the initial pre-strain setting to the final pre-strain setting over the time interval. Thus, e.g., length adjustment mechanism 130 may decrease the pre-strain in elasto-caloric stage 100 by changing the length of elasto-caloric stage 100 from the first length L1 to the third length L3. In such example embodiments, the initial pre-strain setting may be no less than one-half percent (0.5%) and no greater than four percent (4%), and the final pre-strain setting may be no less than six percent (6%) and no greater than ten percent (10%). In particular, the initial pre-strain setting may be about eight percent (8%), and the final pre-strain setting may be about two percent (2%).

As may be seen from the above, a difference between the initial pre-strain setting and the final pre-strain may be no less than four percent (4%) and no greater than ten percent (10%). Such differences between the initial pre-strain setting and the final pre-strain can assist with suitably changing the location of deformations within elasto-caloric stage 100 to increase the fatigue life of elasto-caloric stage 100. In turn, such increases in fatigue life can make elasto-caloric stage 100 more feasible for tension or compression. In addition, changing the pre-strain within elasto-caloric stage 100 may also allow larger deflections and thus larger cooling power and more efficiency.

This written description uses examples to disclose the invention, including the best mode, and also to enable any person skilled in the art to practice the invention, including making and using any devices or systems and performing any incorporated methods. The patentable scope of the invention is defined by the claims, and may include other examples that occur to those skilled in the art. Such other examples are intended to be within the scope of the claims if they include structural elements that do not differ from the literal language of the claims, or if they include equivalent structural elements with insubstantial differences from the literal languages of the claims.

What is claimed is:

1. A method for operating an elasto-caloric heat pump, comprising:
    running the elasto-caloric heat pump with a pre-strain in an elasto-caloric stage of the elasto-caloric heat pump set to an initial pre-strain setting, the elasto-caloric stage having an initial length in the initial pre-strain setting;
    gradually shifting the pre-strain in the elasto-caloric stage of the elasto-caloric heat pump set away from the initial pre-strain setting and towards a final pre-strain setting over a time interval, the elasto-caloric stage having a final length in the final pre-strain setting, the final length being different than the initial length; and
    running the elasto-caloric heat pump at a plurality of pre-strain settings between the initial pre-strain setting and the final pre-strain setting over the time interval.

2. The method of claim 1, wherein a length of the elasto-caloric stage is defined between a first end portion of the elasto-caloric stage and a second end portion of the elasto-caloric stage, and gradually shifting the pre-strain in the elasto-caloric stage comprises moving one of the first and second end portions of the elasto-caloric stage relative to the other of the first and second end portions of the elasto-caloric stage.

3. The method of claim 1, wherein the time interval is a service life of the elasto-caloric heat pump.

4. The method of claim 3, wherein the time interval is no less than three years.

5. The method of claim 1, wherein a difference between the initial pre-strain setting and the final pre-strain is no less than four percent and no greater than ten percent.

6. The method of claim 1, wherein said step of gradually shifting the pre-strain comprises gradually reducing the pre-strain in the elasto-caloric stage of the elasto-caloric heat pump set from the initial pre-strain setting to the final pre-strain setting over the time interval, the initial pre-strain setting is no less than six percent and no greater than ten percent, and the final pre-strain setting is no less than one-half percent and no greater than four percent.

7. The method of claim 1, wherein said step of gradually shifting the pre-strain comprises gradually increasing the pre-strain in the elasto-caloric stage of the elasto-caloric heat pump set from the initial pre-strain setting to the final pre-strain setting over the time interval, the initial pre-strain setting is no less than one-half percent and no greater than four percent, and the final pre-strain setting is no less than six percent and no greater than ten percent.

8. The method of claim 1, wherein gradually shifting the pre-strain in the elasto-caloric stage comprises periodically changing the pre-strain in the elasto-caloric stage from the initial pre-strain setting and towards the final pre-strain setting during the time interval.

9. A method for operating an elasto-caloric heat pump, comprising:
running the elasto-caloric heat pump with a pre-strain in an elasto-caloric stage of the elasto-caloric heat pump set to an initial pre-strain setting; and
step for increasing a fatigue life of the elasto-caloric stage by shifting the pre-strain in the elasto-caloric stage of the elasto-caloric heat pump set away from the initial pre-strain setting and towards a final pre-strain setting over a time interval.

10. The method of claim 9, further comprising running the elasto-caloric heat pump at a plurality of pre-strain settings between the initial pre-strain setting and the final pre-strain setting.

11. The method of claim 9, wherein a length of the elasto-caloric stage is defined between a first end portion of the elasto-caloric stage and a second end portion of the elasto-caloric stage, and gradually shifting the pre-strain in the elasto-caloric stage comprises moving one of the first and second end portions of the elasto-caloric stage relative to the other of the first and second end portions of the elasto-caloric stage.

12. The method of claim 9, wherein the time interval is a service life of the elasto-caloric heat pump.

13. The method of claim 12, wherein the time interval is no less than three years.

14. The method of claim 9, wherein a difference between the initial pre-strain setting and the final pre-strain is no less than four percent and no greater than ten percent.

15. The method of claim 9, wherein said step of gradually shifting the pre-strain comprises gradually reducing the pre-strain in the elasto-caloric stage of the elasto-caloric heat pump set from the initial pre-strain setting to the final pre-strain setting over the time interval, the initial pre-strain setting is no less than six percent and no greater than ten percent, and the final pre-strain setting is no less than one-half percent and no greater than four percent.

16. The method of claim 9, wherein said step of gradually shifting the pre-strain comprises gradually increasing the pre-strain in the elasto-caloric stage of the elasto-caloric heat pump set from the initial pre-strain setting to the final pre-strain setting over the time interval, the initial pre-strain setting is no less than one-half percent and no greater than four percent, and the final pre-strain setting is no less than six percent and no greater than ten percent.

17. The method of claim 9, wherein gradually shifting the pre-strain in the elasto-caloric stage comprises periodically changing the pre-strain in the elasto-caloric stage from the initial pre-strain setting and towards the final pre-strain setting during the time interval.

* * * * *